(12) United States Patent
Ding et al.

(10) Patent No.: US 12,028,665 B2
(45) Date of Patent: Jul. 2, 2024

(54) TERMINAL DEVICE

(71) Applicant: VIVO MOBILE COMMUNICATION CO., LTD., Guangdong (CN)

(72) Inventors: Jian Ding, Guangdong (CN); Junke Gao, Guangdong (CN); Shihu Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 318 days.

(21) Appl. No.: 17/511,338

(22) Filed: Oct. 26, 2021

(65) Prior Publication Data
US 2022/0053251 A1 Feb. 17, 2022

Related U.S. Application Data

(63) Continuation of application No. PCT/CN2020/080229, filed on Mar. 19, 2020.

(30) Foreign Application Priority Data

Apr. 26, 2019 (CN) .......................... 201910345506.9

(51) Int. Cl.
*H04R 1/02* (2006.01)
*H04M 1/02* (2006.01)
*H04M 1/03* (2006.01)

(52) U.S. Cl.
CPC .......... *H04R 1/025* (2013.01); *H04M 1/0266* (2013.01); *H04M 1/0277* (2013.01); *H04M 1/035* (2013.01); *H04R 2499/11* (2013.01)

(58) Field of Classification Search
CPC . H04R 1/025; H04R 2499/11; H04M 1/0266; H04M 1/0277; H04M 1/035
(Continued)

(56) References Cited

U.S. PATENT DOCUMENTS 6,621,910 B1 * 9/2003 Weckstrom ............. H04M 1/03
455/90.3
2007/0149253 A1 * 6/2007 Lee ..................... H04M 1/6016
455/567
(Continued)

FOREIGN PATENT DOCUMENTS

CN 204650192 U 9/2015
CN 106131259 A 11/2016
(Continued)

OTHER PUBLICATIONS

NXP's Quick-Jack solution transforms smartphone audio jacks into multifunctional, self-powered data ports, Jul. 24, 2017, World electronic components.
(Continued)

*Primary Examiner* — April G Gonzales
(74) *Attorney, Agent, or Firm* — IP & T GROUP LLP

(57) ABSTRACT

A terminal device includes: a housing, where the housing is provided with an interface accommodation hole, a sound guide hole, and a sound guide channel, and the sound guide hole is located in a hole wall of the interface accommodation hole; an interface, where the interface is disposed in the housing, and at least a part of the interface is located in the interface accommodation hole; and an acoustic device, where the acoustic device is disposed in the housing, and the sound guide hole is communicated to the acoustic device through the sound guide channel.

20 Claims, 3 Drawing Sheets

(58) Field of Classification Search
USPC ........................................................ 455/569.1
See application file for complete search history.

(56) References Cited

U.S. PATENT DOCUMENTS

| | | | | | |
|---|---|---|---|---|---|
| 2013/0271902 | A1* | 10/2013 | Lai | ..................... | H05K 5/0086 |
| | | | | | 361/679.01 |
| 2015/0289042 | A1* | 10/2015 | Yamaguchi | ............ | H04R 1/025 |
| | | | | | 381/87 |
| 2017/0214986 | A1* | 7/2017 | Sung | ..................... | H04R 1/021 |
| 2017/0366889 | A1* | 12/2017 | Schipper | ................ | H04R 1/086 |
| 2020/0221198 | A1* | 7/2020 | Pupecki | ................. | H04R 1/345 |
| 2022/0053251 | A1* | 2/2022 | Ding | ..................... | H04R 1/025 |

FOREIGN PATENT DOCUMENTS

| | | |
|---|---|---|
| CN | 106131260 A | 11/2016 |
| CN | 106998520 A | 8/2017 |
| CN | 206433177 U | 8/2017 |
| CN | 206596162 U | 10/2017 |
| CN | 207354350 U | 5/2018 |
| CN | 108924320 A | 11/2018 |
| CN | 109547590 A | 3/2019 |
| CN | 208709462 U | 4/2019 |
| CN | 110087167 A | 8/2019 |
| JP | 2007-194757 A | 8/2007 |
| WO | 2013/069865 A1 | 5/2013 |

OTHER PUBLICATIONS

International Search Report of International Application No. PCT/CN2020/080229 dated May 27, 2020.
Written Opinion of The International Searching Authority of International Application No. PCT/CN2020/080229 dated May 27, 2020.
First Office Action of Priority Application No. 201910345506.9 dated Aug. 10, 2020.
The Second Office Action of Priority Application No. 201910345506.9 dated Oct. 23, 2020.

* cited by examiner

TERMINAL DEVICE

CROSS-REFERENCE TO RELATED APPLICATIONS

This application is a Bypass Continuation Application of PCT/CN2020/080229, filed on Mar. 19, 2020, which claims priority to Chinese Patent Application No. 201910345506.9 filed on Apr. 26, 2019, which are incorporated herein by reference in their entirety.

TECHNICAL FIELD

The present disclosure relates to the field of communications technologies, and in particular, to a terminal device.

BACKGROUND

Acoustic devices such as telephone receivers and microphones are commonly used devices in terminal devices. Acoustic devices are usually mounted inside a terminal device. In order to implement transmission of acoustic signals between the acoustic device and an external environment, a sound guide hole needs to be formed in an appearance surface of a housing, to form a sound guide channel communicated to the acoustic device, so that the acoustic signal can be transmitted to the acoustic device through the sound guide channel.

However, forming the sound guide hole in the appearance surface of the housing spoils integrity of the appearance surface of the housing, which results in deterioration in appearance texture of the terminal device and poor user experience. In addition, the sound guide hole occupies part of space of the terminal device in a width direction of the terminal device, which results in limited stacking of components of the terminal device in this direction, increasing difficulty in structural design of the terminal device.

SUMMARY

The present disclosure provides a terminal device.

A terminal device including:

a housing, where the housing is provided with an interface accommodation hole, a sound guide hole, and a sound guide channel, and the sound guide hole is located in a hole wall of the interface accommodation hole;

an interface, where the interface is disposed in the housing, and at least a part of the interface is located in the interface accommodation hole; and an acoustic device, where the acoustic device is disposed in the housing, and the sound guide hole is communicated to the acoustic device through the sound guide channel.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

Figure 1:
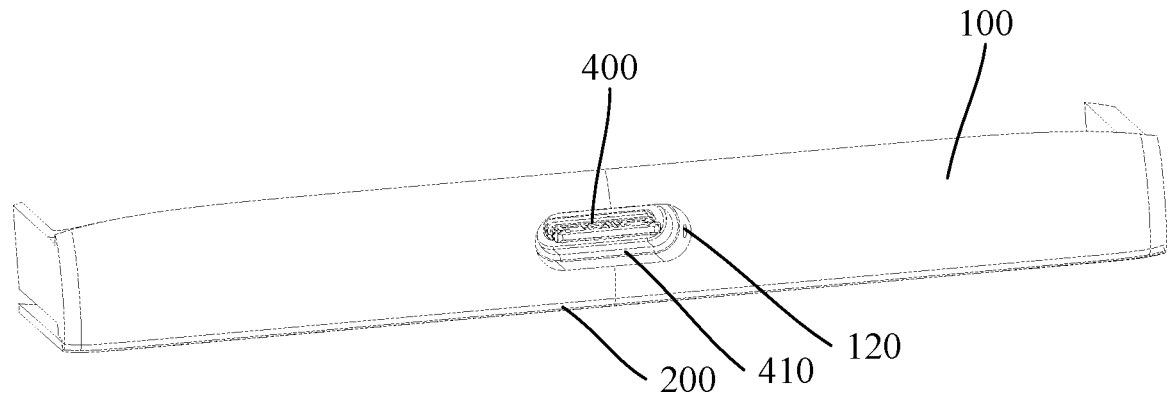
FIG. 1 is a schematic diagram of a partial structure of a terminal device according to an embodiment of the present disclosure.

Reference numerals in the accompanying drawings are as follows:

100—housing, 110—interface accommodation hole, 120—sound guide hole, 130—sound guide channel, 131—first channel, 132—second channel, 133—third channel, 140—first groove, 150—second groove, 200—display screen, 300—circuit board, 400—interface, 410—waterproof sealing ring, 411—first clearance structure, 420—metal frame, 421—second clearance structure, 500—acoustic device, 600—sealing gasket, 700—double-sided adhesive, 800—sealing foam, 810—connecting hole, and 900—dust-proof net.

DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that "and/or" in this specification merely describes an association relationship between associated objects, and indicates that there may be three relationships. For example, A and/or B may represent that there are three cases: There is only A, there are both A and B, and there is only B.

The technical solutions disclosed in the embodiments of the present disclosure are described in detail with reference to the accompanying drawings.

Figure 2:
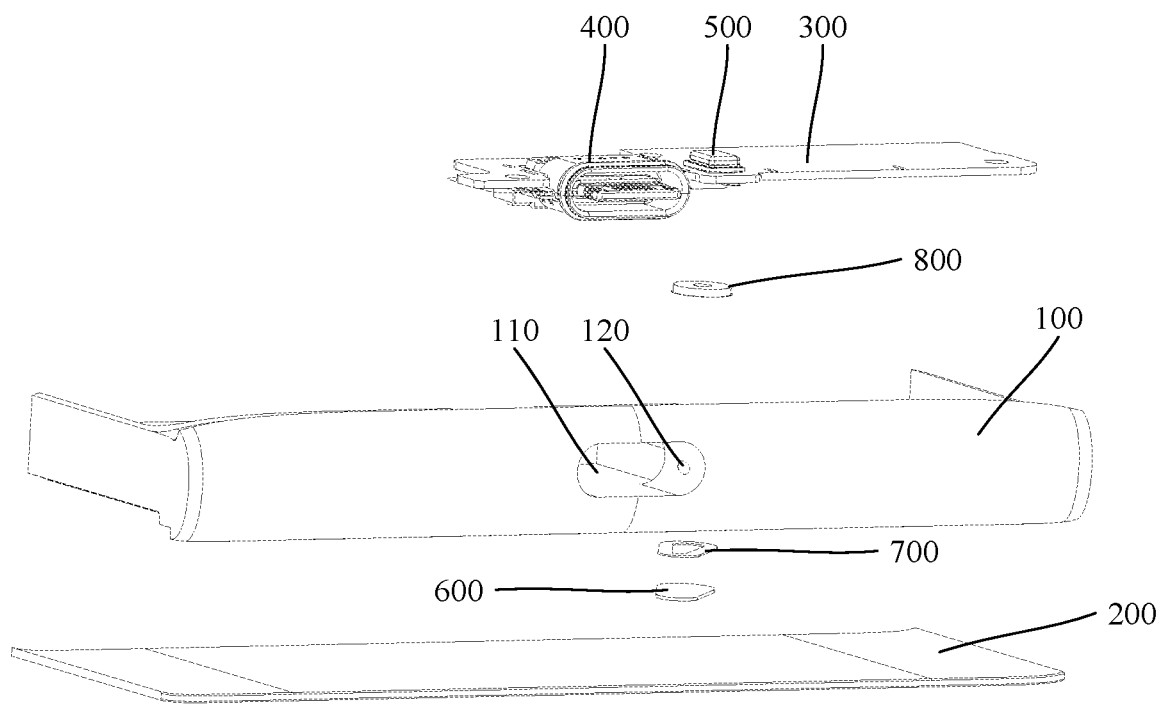
FIG. 2 is an exploded view of the structure shown in FIG. 1.
Figure 3:
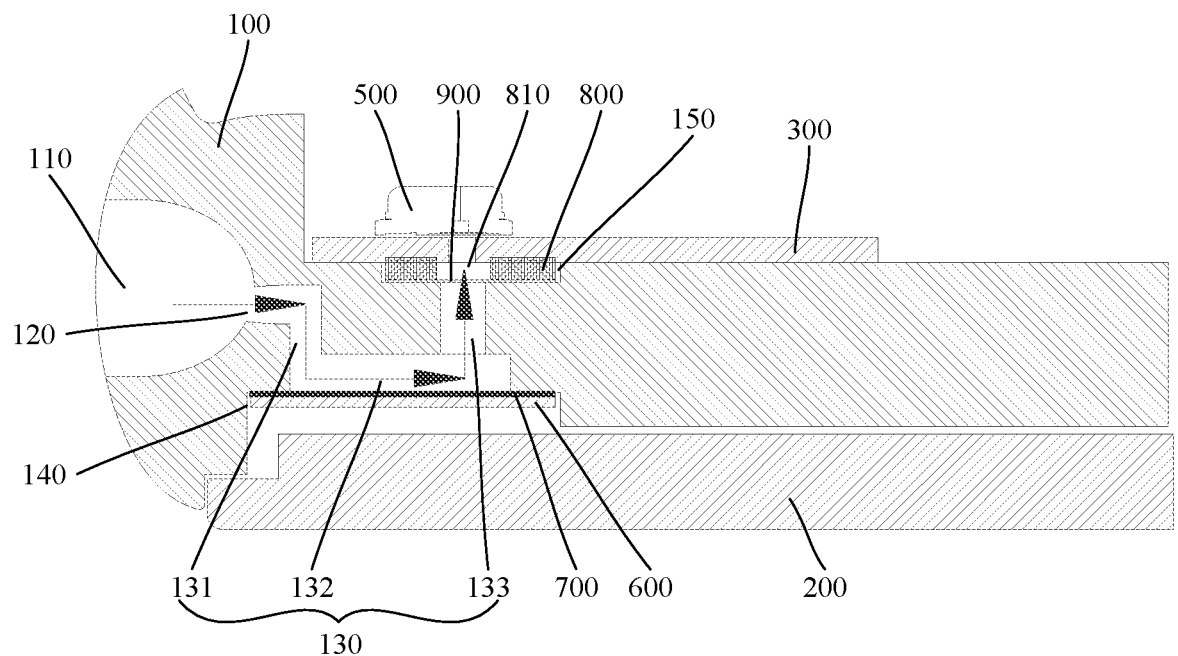
FIG. 3 is a sectional view of the structure shown in FIG. 1, where arrow lines in the figure represent sound guide paths.

As shown in FIG. 1 to FIG. 3, an embodiment of the present disclosure provides a terminal device, including: a housing 100, a display screen 200, a circuit board 300, an interface 400, and an acoustic device 500. The housing 100 is provided with an interface accommodation hole 110, a sound guide hole 120, and a sound guide channel 130, and the sound guide hole 120 is located in a hole wall of the interface accommodation hole 110, that is, the interface accommodation hole 110 is communicated to the sound guide hole 120. Optionally, the sound guide hole 120 may be located at any feasible positions in the hole wall of the interface accommodation hole 110, for example, the sound guide hole 120 may be located at the top, the bottom, or the side of the hole wall. The display screen 200 is disposed on the housing 100, the circuit board 300 is disposed in the housing 100, and the circuit board 300 may be may be a main board of the terminal device. The interface 400 is disposed in the housing 100, and at least a part of the interface 400 is located in the interface accommodation hole 110. The interface 400 can be used for the terminal device to be connected to a charging cable, a data cable, and the like, so as to implement operations such as charging the terminal device and transmitting data to the terminal device. For example, the interface 400 may be a Type-C interface. The acoustic device 500 is also disposed in the housing 100, and the sound guide hole 120 is communicated to the acoustic device 500 through the sound guide channel 130, so that acoustic signals in an external environment can be transmitted to the acoustic device 500, and the acoustic device 500 can process these acoustic signals, to further obtain required signals. The acoustic device 500 may be a microphone or another device with a function of collecting acoustic signals or a function of emitting acoustic signals. The interface 400 and the acoustic device 500 may be mounted on the circuit board 300 in a soldering manner, so that the circuit board 300 can supply power to the interface 400 and the acoustic device 500 and control the interface 400 and the acoustic device 500.

When the terminal device is used, an acoustic signal enters the acoustic device 500 after sequentially passing through the interface accommodation hole 110, the sound guide hole 120, and the sound guide channel 130, or a sound signal emitted by the acoustic device 500 enters the external environment after sequentially passing through the sound guide channel 130, the sound guide hole 120, and the interface accommodation hole 110. There is no need to additionally form the sound guide hole 120 in the housing 100 of the terminal device, so that the sound guide hole 120 cannot be seen from an appearance surface of the housing 100, and therefore the sound guide hole 120 does not affect appearance integrity of the housing 100, making user experience of the terminal device better. In addition, the sound guide hole 120 does not additionally occupy space in a width direction of the terminal device, so that components in the terminal device are more easily stacked, making structural design of the terminal device simpler.

A structure of the sound guide channel 130 can be flexibly set according to an overall structure of the terminal device. As shown in FIG. 3, in this embodiment of the present disclosure, the sound guide channel 130 may include a first channel 131, a second channel 132, and a third channel 133 that are sequentially communicated to each other, the first channel 131 extends from the sound guide hole 120 towards a direction close to the display screen 200, the second channel 132 is formed in a surface of the housing 100 facing the display screen 200, and the third channel 133 extends from one end of the second channel 132 towards a direction away from the display screen 200. First, with such a setting method, the sound guide channel 130 is endowed with a circuitous structure. Once impurities such as dust in the external environment enter the sound guide channel 130, the sound guide channel 130 can intercept these impurities to a greater extent, to prevent these impurities from further entering the acoustic device 500, thereby improving working reliability of the acoustic device 500. Secondly, the first channel 131, the second channel 132, and the third channel 133 all penetrate to the surface of the housing 100, so that the first channel 131, the second channel 132, and the third channel 133 can be machined more easily, making machining costs of the housing 100 lower.

To enhance tightness of the sound guide channel 130 and avoid a problem of sound leakage, the terminal device may further include a sealing gasket 600 disposed at the second channel 132. The sealing gasket 600 and the housing 100 jointly form the second channel 132, making it difficult for impurities in the external environment to enter the sound guide channel 130 through the second channel 132. Optionally, the sealing gasket 600 may be bonded, by using a double-sided adhesive 700, onto a surface of the housing 100 facing the display screen 200. Such a mounting method not only can guarantee mounting reliability of the sealing gasket 600, but also can simplify an assembly process of the terminal device.

In an optional embodiment, the housing 100 may be provided with a first groove 140, the second channel 132 is formed in a bottom surface of the first groove 140, and the sealing gasket 600 is fixed to an edge of the bottom surface of the first groove 140 in an overlapping manner. After the first groove 140 is disposed, the sealing gasket 600 recesses relative to the housing 100, so that the sealing gasket 600 basically does not occupy additional space, thereby reducing a thickness of the terminal device. In addition, the first groove 140 may also provide reference for a fixed position of the sealing gasket 600, so as to quickly and accurately fix the sealing gasket 600 on the housing 100.

As mentioned above, at least a part of the interface 400 is located in the interface accommodation hole 110, and the interface 400 is usually detachably mounted in the interface accommodation hole 110. Therefore, to enhance tightness between the interface 400 and the interface accommodation hole 110, the interface 400 includes a waterproof sealing ring 410 disposed in the interface accommodation hole 110. To prevent the sound guide hole 120 from being blocked by the waterproof sealing ring 410, the sound guide hole 120 may be disposed between the waterproof sealing ring 410 and an outlet end of the interface accommodation hole 110. The outlet end of the interface accommodation hole 110 refers to one end of the interface accommodation hole 110 that is connected to an outer surface of the housing 100. In other words, in a thickness direction of the terminal device, a projection plane of the waterproof sealing ring 410 is not overlapped with a projection plane of the sound guide hole 120.

Figure 4:
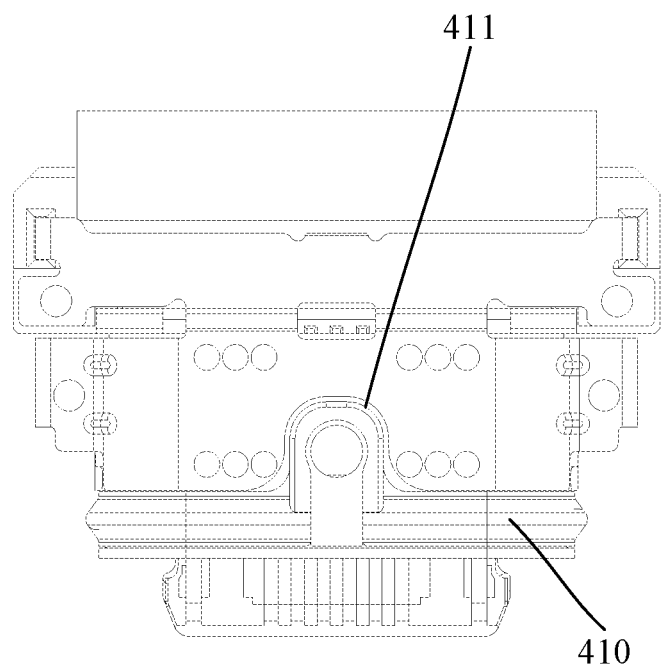
FIG. 4 is a schematic structural diagram of an interface in a terminal device according to another embodiment of the present disclosure.
Figure 5:
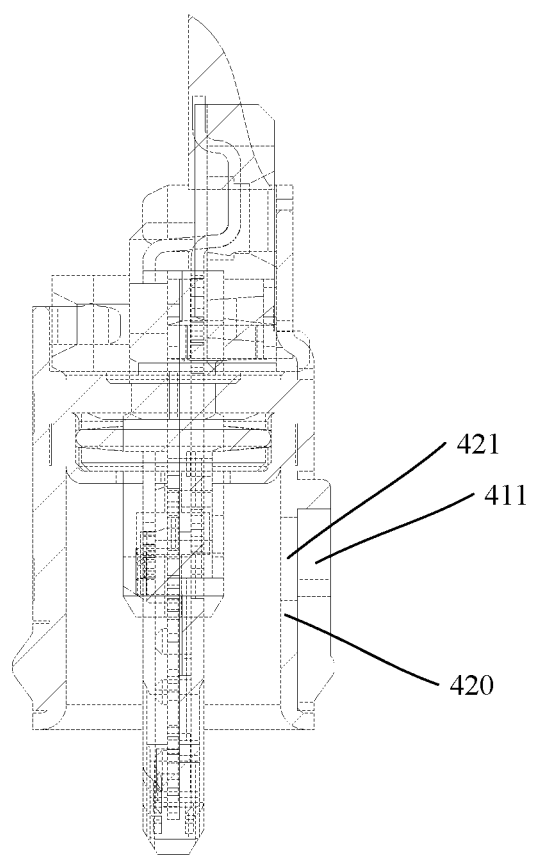
FIG. 5 is a sectional view of the structure shown in FIG. 4.

However, in some cases, the sound guide hole 120 cannot be disposed between the waterproof sealing ring 410 and the outlet end of the interface accommodation hole 110. If the sound guide hole 120 needs to be disposed, there is a need to narrow the waterproof sealing ring 410, which makes a contact area between the waterproof sealing ring 410 and the housing 100 smaller, resulting in a poor sealing effect. Therefore, as shown in FIG. 4 and FIG. 5, to take formation of the sound guide hole 120 and a waterproof effect of the waterproof sealing ring 410, a first clearance structure 411 may be formed in the waterproof sealing ring 410, and the sound guide hole 120 faces the first clearance structure 411. In other words, only a part of materials of the waterproof sealing ring 410 is removed, to expose the sound guide hole 120, and a remaining part of the waterproof sealing ring 410 still has a predetermined width, which can not only guarantee a contact area between the interface 400 and the housing 100, but also prevent the sound guide hole 120 from being blocked by the waterproof sealing ring 410.

To enable the interface 400 to be more firmly mounted in the interface accommodation hole 110, the interface 400 further includes a metal frame 420. At least a part of the metal frame 420 is located in the interface accommodation hole 110, and the waterproof sealing ring 410 is located between the metal frame 420 and the housing 100, thereby implementing tightness between the metal frame 420 and the housing 100. Due to a larger width of the metal frame 420, the metal frame 420 easily blocks the sound guide hole 120. In this case, even if the waterproof sealing ring 410 is provided with the first clearance structure 411, the sound guide hole 120 may still be blocked by the metal frame 420. In view of this, the metal frame 420 may be provided with a second clearance structure 421. The second clearance structure 421 and the first clearance structure 411 are oppositely disposed. In this case, neither the metal frame 420 nor the waterproof sealing ring 410 block the sound guide hole 120.

Optionally, the first clearance structure 411 may be formed as a clearance notch, so as to facilitate machining of the waterproof sealing ring 410. In addition, when the first clearance structure 411 is formed as a clearance notch, the clearance notch may penetrate to an edge of the waterproof sealing ring 410. Even if the interface accommodation hole 110 is matched with a charging cable or a data cable, the clearance notch may constantly be communicated to the external environment. Therefore, sound in the external environment may still enter the acoustic device 500 although because of blocking of the charging cable or the data cable.

The second clearance structure 421 may be formed as a clearance hole, to facilitate machining of the metal frame 420.

To prevent sound leakage at a position where the circuit board 300 and the housing 100 are connected, the terminal device further includes sealing foam 800 disposed between the circuit board 300 and the housing 100. As shown in FIG. 3, the sealing foam 800 is provided with a connecting hole 810, and the sound guide channel 130 is communicated to the acoustic device 500 through the connecting hole 810. Optionally, the terminal device further includes a dust-proof net 900, and the dust-proof net 900 is disposed between the sealing foam 800 and the housing 100. The dust-proof net 900 can prevent impurities in the external environment from entering the acoustic device 500 through the sound guide channel 130, thereby protecting the acoustic device 500.

Optionally, a surface of the housing 100 facing the circuit board 300 is provided with a second groove 150, and the sealing foam 800 is located in the second groove 150. In this case, the sealing foam 800 recesses relative to the housing 100, occupies smaller space in a thickness direction of the terminal device, and does not even occupy additional space. Therefore, a thickness of the terminal device can be reduced. Certainly, if the dust-proof net 900 is disposed, the dust-proof net 900 is also located in the second groove 150.

The terminal device disclosed in the embodiments of the present disclosure may be a smartphone, a tablet computer, an e-book reader, or a wearable device. Certainly, the terminal device may be another terminal device. This is not limited in the embodiments of the present disclosure.

The foregoing embodiments of the present disclosure focus on describing differences between the embodiments, and different optimization features of the embodiments may be combined to form better embodiments provided that they are not contradictory. For brevity, details are not described herein again.

The foregoing descriptions are merely embodiments of the present disclosure, but are not intended to limit the present disclosure. For a person skilled in the art, the present disclosure may have various changes and variations. Any modification, equivalent replacement, or improvement made without departing from the spirit and principle of the present disclosure shall fall within the scope of claims of the present disclosure.

What is claimed is:

1. A terminal device comprising:
 a housing, wherein the housing is provided with an interface accommodation hole, a sound guide hole, and a sound guide channel, and the sound guide hole is located in a hole wall of the interface accommodation hole;
 an interface, wherein the interface is disposed in the housing, and at least a part of the interface is located in the interface accommodation hole; and
 an acoustic device, wherein the acoustic device is disposed in the housing, and the sound guide hole is communicated to the acoustic device through the sound guide channel;
 wherein the sound guide channel comprises a first channel, a second channel, and a third channel that are sequentially communicated to each other, the first channel extends from the sound guide hole towards a direction close to a display screen of the terminal device, the second channel is formed in a surface of the housing facing the display screen, and the third channel extends from one end of the second channel towards a direction away from the display screen.

2. The terminal device according to claim 1, further comprising a sealing gasket disposed at the second channel, wherein the sealing gasket and the housing jointly form the second channel.

3. The terminal device according to claim 2, wherein the housing is provided with a first groove, the second channel is formed in a bottom surface of the first groove, and the sealing gasket is connected to an edge of the bottom surface in an overlapping manner.

4. The terminal device according to claim 1, wherein the interface comprises a waterproof sealing ring disposed in the interface accommodation hole, and the sound guide hole is located between the waterproof sealing ring and an outlet end of the interface accommodation hole.

5. The terminal device according to claim 1, wherein the interface comprises a waterproof sealing ring disposed in the interface accommodation hole, the waterproof sealing ring is provided with a first clearance structure, and the sound guide hole faces the first clearance structure.

6. The terminal device according to claim 5, wherein the interface further comprises a metal frame, at least a part of the metal frame is located in the interface accommodation hole, the waterproof sealing ring is located between the metal frame and the housing, the metal frame is provided with a second clearance structure, and the second clearance structure and the first clearance structure are oppositely disposed.

7. The terminal device according to claim 6, wherein the first clearance structure is a clearance notch, and/or the second clearance structure is a clearance hole.

8. The terminal device according to claim 1, wherein the acoustic device is mounted on a circuit board, the terminal device further comprises sealing foam disposed between the circuit board and the housing, the sealing foam is provided with a connecting hole, and the sound guide channel is communicated to the acoustic device through the connecting hole.

9. The terminal device according to claim 8, further comprising a dust-proof net, wherein the dust-proof net is disposed between the sealing foam and the housing.

10. The terminal device according to claim 8, wherein a surface of the housing facing the circuit board is provided with a second groove, and the sealing foam is located in the second groove.

11. A terminal device comprising:
 a housing, wherein the housing is provided with an interface accommodation hole, a sound guide hole, and a sound guide channel, and the sound guide hole is located in a hole wall of the interface accommodation hole;

an interface, wherein the interface is disposed in the housing, and at least a part of the interface is located in the interface accommodation hole; and an acoustic device, wherein the acoustic device is disposed in the housing, and the sound guide hole is communicated to the acoustic device through the sound guide channel, wherein the interface comprises a waterproof sealing ring disposed in the interface accommodation hole, the waterproof sealing ring is provided with a first clearance structure, and the sound guide hole faces the first clearance structure, and wherein the interface further comprises a metal frame, at least a part of the metal frame is located in the interface accommodation hole, the waterproof sealing ring is located between the metal frame and the housing, the metal frame is provided with a second clearance structure, and the second clearance structure and the first clearance structure are oppositely disposed.

12. The terminal device according to claim 11, wherein the first clearance structure is a clearance notch, and/or the second clearance structure is a clearance hole.

13. The terminal device according to claim 11, wherein the sound guide channel comprises a first channel, a second channel, and a third channel that are sequentially communicated to each other, the first channel extends from the sound guide hole towards a direction close to a display screen of the terminal device, the second channel is formed in a surface of the housing facing the display screen, and the third channel extends from one end of the second channel towards a direction away from the display screen.

14. The terminal device according to claim 13, further comprising a sealing gasket disposed at the second channel, wherein the sealing gasket and the housing jointly form the second channel.

15. A terminal device comprising:
a housing, wherein the housing is provided with an interface accommodation hole, a sound guide hole, and a sound guide channel, and the sound guide hole is located in a hole wall of the interface accommodation hole;

an interface, wherein the interface is disposed in the housing, and at least a part of the interface is located in the interface accommodation hole; and an acoustic device, wherein the acoustic device is disposed in the housing, and the sound guide hole is communicated to the acoustic device through the sound guide channel; wherein the acoustic device is mounted on a circuit board, the terminal device further comprises sealing foam disposed between the circuit board and the housing, the sealing foam is provided with a connecting hole, and the sound guide channel is communicated to the acoustic device through the connecting hole.

16. The terminal device according to claim 15, further comprising a dust-proof net, wherein the dust-proof net is disposed between the sealing foam and the housing.

17. The terminal device according to claim 15, wherein a surface of the housing facing the circuit board is provided with a second groove, and the sealing foam is located in the second groove.

18. The terminal device according to claim 15, wherein the sound guide channel comprises a first channel, a second channel, and a third channel that are sequentially communicated to each other, the first channel extends from the sound guide hole towards a direction close to a display screen of the terminal device, the second channel is formed in a surface of the housing facing the display screen, and the third channel extends from one end of the second channel towards a direction away from the display screen.

19. The terminal device according to claim 18, further comprising a sealing gasket disposed at the second channel, wherein the sealing gasket and the housing jointly form the second channel.

20. The terminal device according to claim 19, wherein the housing is provided with a first groove, the second channel is formed in a bottom surface of the first groove, and the sealing gasket is connected to an edge of the bottom surface in an overlapping manner.

* * * * *